(12) United States Patent
Tsai et al.

(10) Patent No.: US 11,288,376 B2
(45) Date of Patent: Mar. 29, 2022

(54) IDENTIFYING HARD-CODED SECRET VULNERABILITY INSIDE APPLICATION SOURCE CODE

(71) Applicant: International Business Machines Corporation, Armonk, NY (US)

(72) Inventors: Ya-Hsuan Tsai, Taipei (TW); Chun-Shuo Lin, Tainan (TW); Chuang Hsin-Yu, Taoyuan (TW)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 16/401,598

(22) Filed: May 2, 2019

(65) Prior Publication Data
US 2020/0349259 A1 Nov. 5, 2020

(51) Int. Cl.
  *G06F 21/56* (2013.01)
  *G06F 21/57* (2013.01)
  *G06F 21/12* (2013.01)

(52) U.S. Cl.
  CPC .......... *G06F 21/577* (2013.01); *G06F 21/125* (2013.01); *G06F 21/562* (2013.01); *G06F 21/563* (2013.01); *G06F 2221/033* (2013.01)

(58) Field of Classification Search
  None
  See application file for complete search history.

(56) References Cited

U.S. PATENT DOCUMENTS

| 8,424,077 | B2 | 4/2013 | Adams et al. |
| 8,468,594 | B2 | 6/2013 | Sade et al. |
| 8,621,237 | B1 | 12/2013 | Bailey et al. |
| 9,104,878 | B1 | 8/2015 | Khairetdinov |
| 9,336,381 | B1 | 5/2016 | Kane-Parry et al. |
| 9,465,942 | B1* | 10/2016 | Kane-Parry .............. G06F 21/57 |
| 10,929,277 | B2* | 2/2021 | Zang .......................... G06F 8/40 |
| 2005/0240999 | A1* | 10/2005 | Rubin .................... G06F 21/563 726/22 |

(Continued)

OTHER PUBLICATIONS

Constantin, "This tool can help weed out hard-coded keys from software projects," pcworld.com, Jan. 2017.

(Continued)

*Primary Examiner* — Fatoumata Traore
(74) *Attorney, Agent, or Firm* — Jeffrey S. LaBaw; David H. Judson

(57) ABSTRACT

A source code analysis tool is augmented to support rule-based analysis of code to attempt to identify certain lexical information indicative of hard-coded secret (e.g., password) support in the code. The tool takes the source code as input, parses the content with a lexical analyzer based on language grammar, and processes the resulting data through preferably a pair of rule-based engines. Preferably, one engine is configured to identify variables explicitly intended to be used as a hard-coded secret, and the other engine is configured to identify data strings that could potentially support such a secret. The outputs of these rules engines are consolidated and evaluated to identify a likelihood that the code under examination includes support for a hard-coded secret. The result is then provided to the developer for further action to address any potential security vulnerability identified by the analysis.

21 Claims, 5 Drawing Sheets

(56) References Cited

U.S. PATENT DOCUMENTS

| | | | |
|---|---|---|---|
| 2012/0042361 A1* | 2/2012 | Wong | G06F 21/55 |
| | | | 726/4 |
| 2017/0033934 A1 | 2/2017 | Camenisch | |
| 2017/0033994 A1 | 2/2017 | Hunt et al. | |
| 2018/0316715 A1* | 11/2018 | Liu | G06F 8/42 |

OTHER PUBLICATIONS

Prusty, "Extending SAST tools to detect hard-coded passwords vulnerabilty," Tata Cyber Security Community, Feb. 2016.
MITRE, "CWE-259: Use of hard-coded password," http7/www.cvedetails.com/cwe-details/259/Use-of-Hard-coded-Password.html, Jan. 3, 2019.
OWASP, "Use of hard-coded password," https://www.owasp.org/index.php/Use_of_hard-coded_password, Jun. 2016.
Martin, et al., "2011 CWE/SANS Top 25 Most Dangerous Software Errors," https://cwe.mitre.org/top25/archive/2011/2011_cwe_sans_top25.pdf, Sep. 2011.

* cited by examiner

A1. as parameter to specific algorithm API ~600

```
// OpenSSL encryption context initialization
unsigned char key [ ] = {0,1,2,3,4,5,6,7,8,9,10,11,12,13,14,15};
unsigned char iv [ ] = {1,2,3,4,5,6,7,8};
EVP_CIPHER_CTX *ctx = EVP_CIPHER_CTX_new();
EVP_EncryptInit_ex(ctx, EVP_idea_cbc ( ) , NULL, key, iv);
```

A2. as parameter to specific security API ~602

```
// Win32 API to acquire token handle from other user
BOOL LogonUser (
   _In_      LPTSTR    lpszUsername,
   _In_opt_  LPTSTR    lpszDomain,
   _In_opt_  LPTSTR    lpszPassword,
   _In_      DWORD     dwLogonType,
   _In_      DWORD     dwLogonProvider,
   _Out_     PHANDLE   phToken
);
```

A3. as argument to specific utility API ~604

```
// hard-coded password for sqlite database
SQLiteConnection conn = new SQLiteConnection ("Data Source=MyDatabase.sqlite;Version=3;");
conn.SetPassword("password") ;
conn.open( ) ;
```

A4. as argument to specific system command ~606

```
// change user password from shell
char* name= "user1";
char* password= "@Dgfw%hsf!2F";
std: :string cmd = " echo '";
cmd.append (name) .append (":").append (password).append("' | chpasswd
// result - > echo "user1:@Dgfw%hsf!2F"  | chpasswd
system(cmd.c_str ( ) ) ;
```

A5. as input to other entries with similar concept ~608

```
connect_remote (char* user, char* password) {
   DB_connect ("9.191.34.7:9900",user, password) ;
}
main ( ) {
   char* user = "john";
   char* password = "@Dgfw%hsf!2F";
   connect_remote (user, password) ;
}
```

FIG. 6

```
char* my_data = "@Dgfw%hsf!2F" ;   ──700 unsigned char key [ ] = {0,1,2,3,4,5,6,7,8,9,10,11,12,13,14,15} ;   ──702 char* password="@Dgfw%hsf!2F"   ──704
```

FIG. 7

IDENTIFYING HARD-CODED SECRET VULNERABILITY INSIDE APPLICATION SOURCE CODE

BACKGROUND OF THE INVENTION

Technical Field

This disclosure relates generally to identifying and remediating application vulnerabilities using static analysis tools.

Background of the Related Art

Today, most organizations depend on web-based software and systems to run their business processes, conduct transactions with suppliers, and deliver sophisticated services to customers. Unfortunately, many organizations invest little to no effort in ensuring that those applications are secure. Web-based systems can compromise the overall security of organizations by introducing vulnerabilities that hackers can use to gain access to confidential company information or customer data.

To address this deficiency, static analysis tools and services have been developed. Static security analysis (or "static analysis" for short) solutions help organization address web and mobile application vulnerabilities through a secure-by-design approach. This approach embeds security testing into the software development lifecycle itself, providing organizations with the tools they require to develop more secure code. Static analysis tools are often used by computer software developers to provide information about computer software while applying only static considerations (i.e., without executing a computer software application). Such tools simplify remediation by identifying vulnerabilities in web and mobile applications prior to their deployment, generating results (reports and fix recommendations) through comprehensive scanning, and combining advanced dynamic and innovative hybrid analyses of glass-box testing (run-time analysis, also known as integrated application security testing) with static taint analysis for superior accuracy. A representative commercial offering of this type is IBM® Security AppScan®, which enhances web application security and mobile application security, improves application security program management and strengthens regulatory compliance.

Typically, application analysis tools of this type produce security "findings" that summarize security vulnerabilities residing in application source code. A complete set of static security findings typically are modeled as "traces," wherein a trace is a code execution path that starts with a "source" (which is vulnerable to malicious user input), passes through one of more internal nodes, and ends in a "sink" (which has a security impact to an application). After being generated by an analysis engine, these traces typically are then presented in a user interface of the security software.

Software programs that facilitate user authentication to protected resources (machines, websites, etc.) often are configured to store sensitive information, such as user passwords, login credentials, biometrics (e.g., fingerprints) and the like A well-known example is an operating system utility that allows users to log into their devices using a fingerprint reader. When these types of secrets are protected by weak algorithms, however, they are vulnerable to access by all users with local, non-administrative access to the system. This vulnerability, known as the hard-coded password vulnerability (CVE-2017-3752), allows leaks of sensitive user data.

While a provider can provide a security patch to address this type of vulnerability after-the-fact, it would be useful to provide a way for a developer to determine in advance whether source code will exhibit this vulnerability when used. Such early detection would enable the developer to address the potential vulnerability during the design stage.

BRIEF SUMMARY

A source code analysis tool is augmented to provide for enhanced security vulnerability determination from generated code traces. According to this disclosure, the analysis tool is augmented to include a pair of rule-based engines (or multiple instances of a single rule-based engine) that examine code for certain lexical information indicative of hard-coded secret support in the code. The tool takes the source code as input, parses the content with a lexical analyzer based on language grammar, and processes the resulting data through the rule-based engine(s). Preferably, one engine (or instance thereof) is configured to identify data strings (e.g., variables) that are explicitly intended to be used as a hard-coded secret, and the other engine (or instance) is configured to identify data strings that could potentially support such a secret. The rule engine outputs are consolidated and evaluated (typically via scoring) to identify a likelihood that the code under examination includes support for a hard-coded secret. The result is then provided to the developer, e.g., via a notification, a visualization, or the like, so that the developer can take further action to address or ameliorate the potential security vulnerability that would otherwise arise when the code that includes the hard-coded secret support is later used as intended.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 depicts several example code snippets that are evaluated by a first rules engine according to this disclosure; and FIG. 7 depicts several example code snippets that are evaluated by a second rules engine according to this disclosure.

DETAILED DESCRIPTION OF AN ILLUSTRATIVE EMBODIMENT

Figure 1:
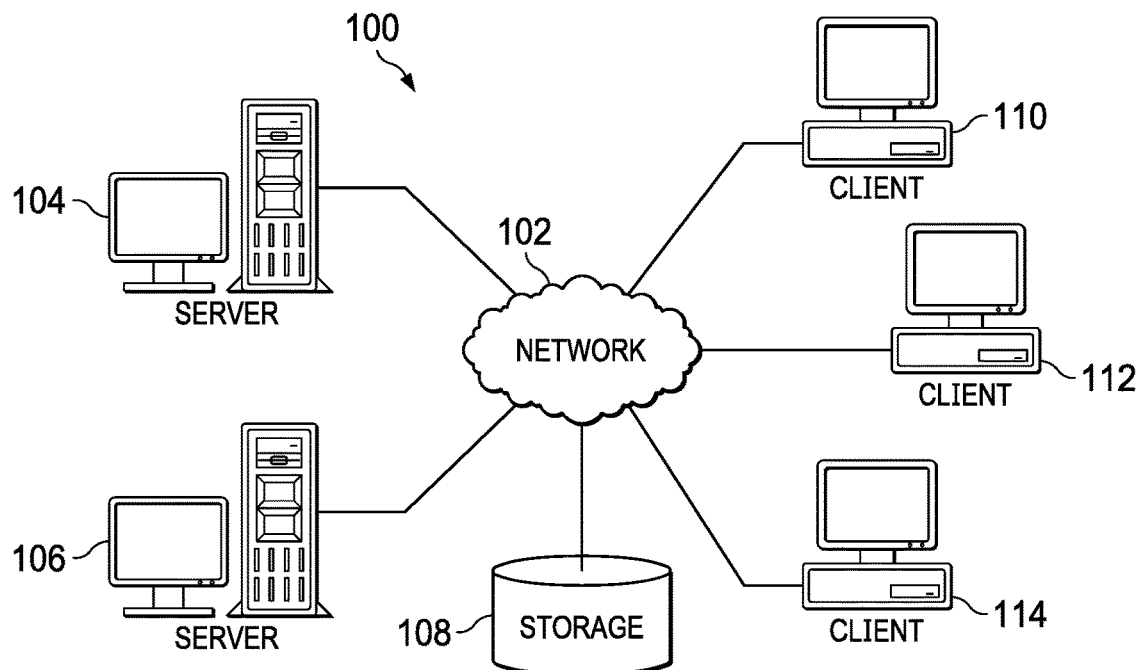
FIG. 1 depicts an exemplary block diagram of a distributed data processing environment in which exemplary aspects of the illustrative embodiments may be implemented.
Figure 2:
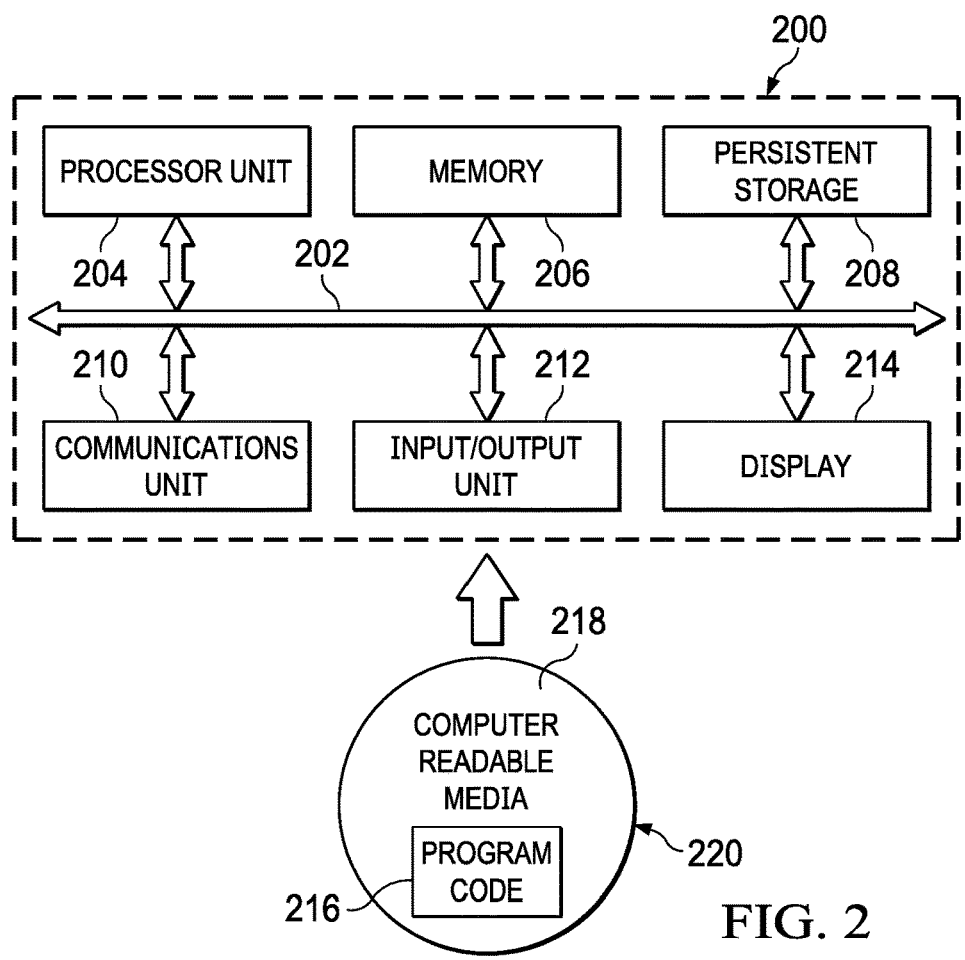
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
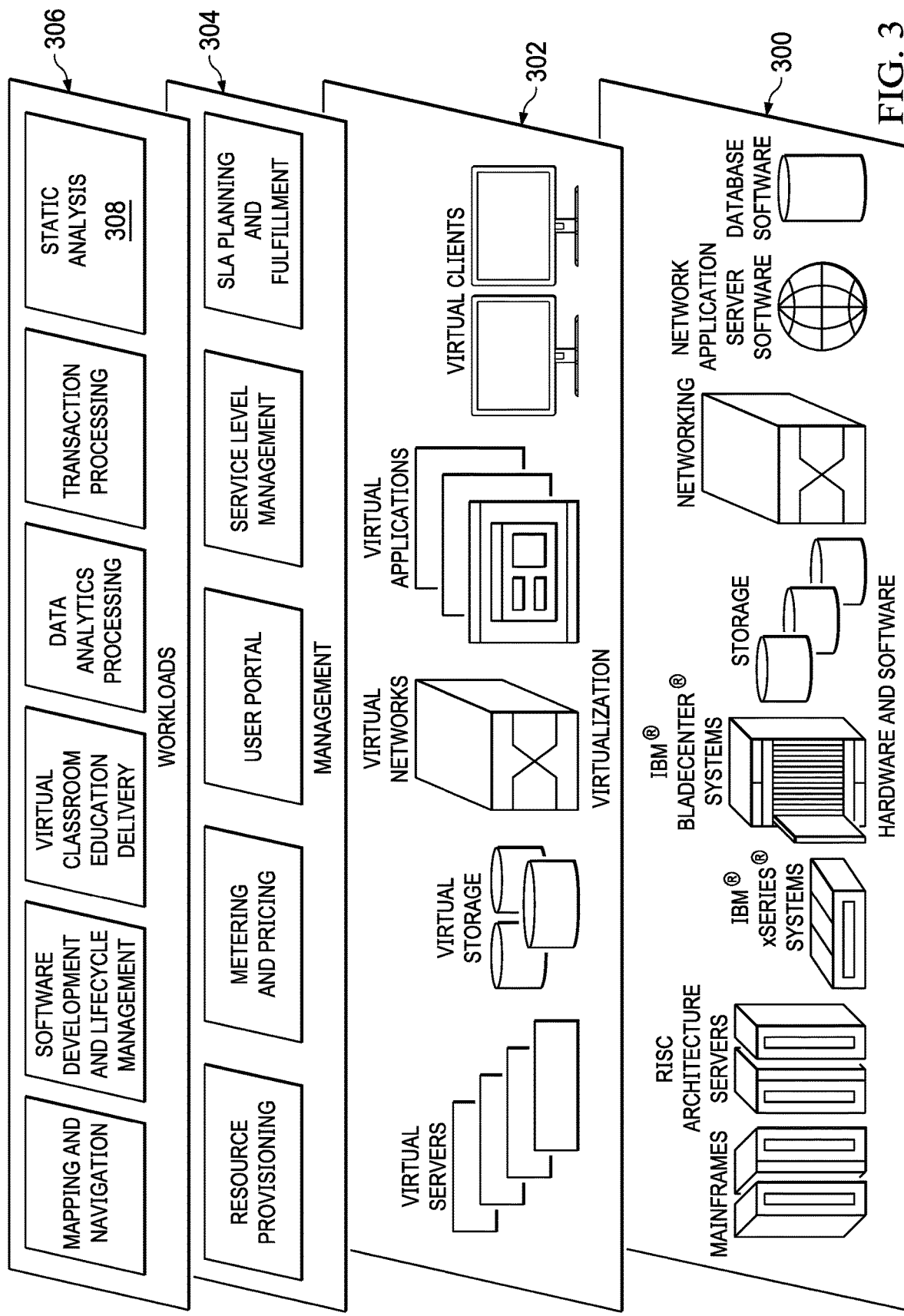
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, static security analysis 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

In one embodiment, a static analysis tool, such as IBM AppScan Enterprise Edition, is implemented as a cloud-based application.

Static Analysis Tools and Services

As is well-known, static analysis tools are used by computer software developers to provide information about computer software while applying only static considerations (i.e., without executing a computer software application). More formally, and as used herein, the term "static program analysis" means an analysis of a static representation of an application. In one type of static analysis, data flows are traced within a computer software application from "sources," typically application programming interfaces (API) that introduce "untrusted" input into a program, such as user input, to "sinks," typically security-sensitive operations such as modifying a database. More generally, the term "sink" or "security sink" means a module, function or procedure that consumes in input value and performs an operation on the input value that is security sensitive.

Such flows are identified as security vulnerabilities that may require remediation, typically by ensuring that a flow that is identified as a security vulnerability encounters a "downgrader" that validates and/or sanitizes untrusted input, such as by checking whether the input contains illegal characters or is in an illegal format, both common tactics used in malicious attacks. Generalizing, a "downgrader" refers to a module, routing or function that endorses, sanitizes and/or validates input data. Static analysis tools that identify security vulnerabilities typically provide computer software developers with a short description of each type of security vulnerability found, and may even provide sample code snippets that may be used by the developer to construct a downgrader for remediating the security vulnerability.

In operation, a static program analysis may analyze a call-tree representing previously recorded call stacks of the application to identify security vulnerabilities that may be present in the application. The term "call stack" refers to a stack data structure that stores information about the active subroutines of a computer program, such as an application. Without limitation, the static security analysis typically takes the form of taint analysis, where the analysis is parameterized by a set of security rules, each rule being a triple <Source, San, Sink>, where Source denotes source statements that read untrusted user inputs, San denotes downgrader statements that endorse untrusted data by validating and/or sanitizing it, and Sink denotes sink statements which perform security-sensitive operations. Given a security rule R, any flow from a source in $Source_R$ to a sink in $Sink_R$ that does not pass through a downgrader from $San_R$ comprises a potential vulnerability. This approach thus reduces security analysis to a graph reachability problem.

During static analysis of the computer program, the security analysis application analyses the computer model represented by the control flow call-graph, to determine whether there are potential paths, during execution of the computer program, from the source to the sink without the user-provided data being downgraded by the downgrader. One such path is indicated in the call-graph by an edge. This path generally is undesirable, and may indicate a security vulnerability in the computer program. In this regard, the edge can represent a witness to a security vulnerability, and this witness is then reported as a "finding" to the user.

Figure 4:
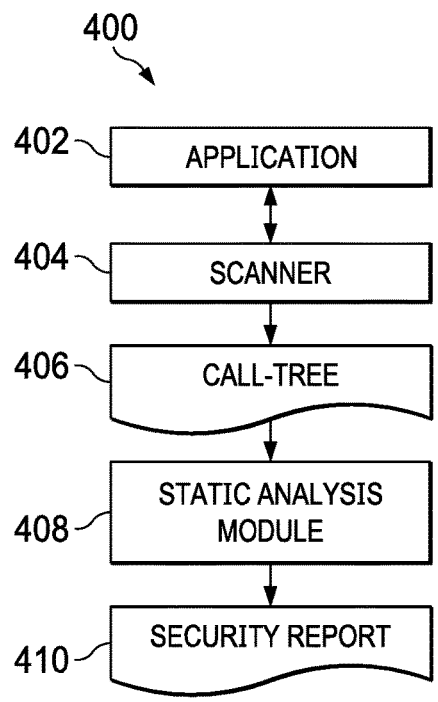
FIG. 4 is a block diagram illustrating a known static analysis technique for analyzing vulnerable information flows in an application.

FIG. 4 is a block diagram illustrating a system 400 for analyzing vulnerable information flows in an application 402. In this known scenario, static analysis is used in addition to a black-box scan. As seen in FIG. 4, while the application 402 executes, the scanner 404 performs a scan of the application and, based on the scan, generates a call-graph 406 representing call stacks arising in the application during processing of test inputs provided to the application 402. The call-graph 406 may be pre-generated or provided from some other data source (e.g., a configuration file). As depicted, the system 400 includes a static analysis module 408 that performs a static analysis of the application 402. Specifically, the static analysis module 408 performs a static analysis of the call-graph 406 in which the call stacks identified by the black-box scanner 404 are recorded. As described above, in this way the static analysis module 408 can identify paths (i.e., flows) in the call-graph 406 that potentially represent security vulnerabilities in the application 402. For example, the static analysis module 408 can generate a security report 410 that indicates such paths as witnesses to security vulnerabilities. Security report 410 can be made to be available to a user in any suitable manner. For example, security report 410 can be presented on a display, presented in a printout, stored to a file, or the like.

Identifying Hard-Coded Secrets Inside Source Code

With the above as background, the subject matter of this disclosure is now described.

As noted above, in a conventional static analysis, the SAST software (such as IBM AppScan Source) takes application source code as input, and performs security analysis. The tool produces results containing one or more security vulnerability findings. This result typically is output into an XML file. This type of analysis is augmented according to this disclosure to provide a capability to detect that the source code might expose hard-coded secrets when the code is used. As used herein, the notion of the hard-coded secret is dependent on the nature and function of the source code being developed; typically, however, the "secret" is information that an end user of the software would want or expect to remain private and not exposed, e.g. to others who might have local, non-administrative access to the system in which the software (typically a commercial version of the compiled source code) is later installed and running. To address this problem, and according to this disclosure, the SAST software is modified (or augmented) to provide hard-code secret identification support that outputs a vulnerability finding (or otherwise augments some other finding) to enable the developer to address the potential security exposure. With the hard-coded secret support identified in this manner, the developer can investigate the issue and attempt to mitigate it during the development process instead of addressing the vulnerability once it is later discovered when the code is later used for its intended purpose.

Figure 5:
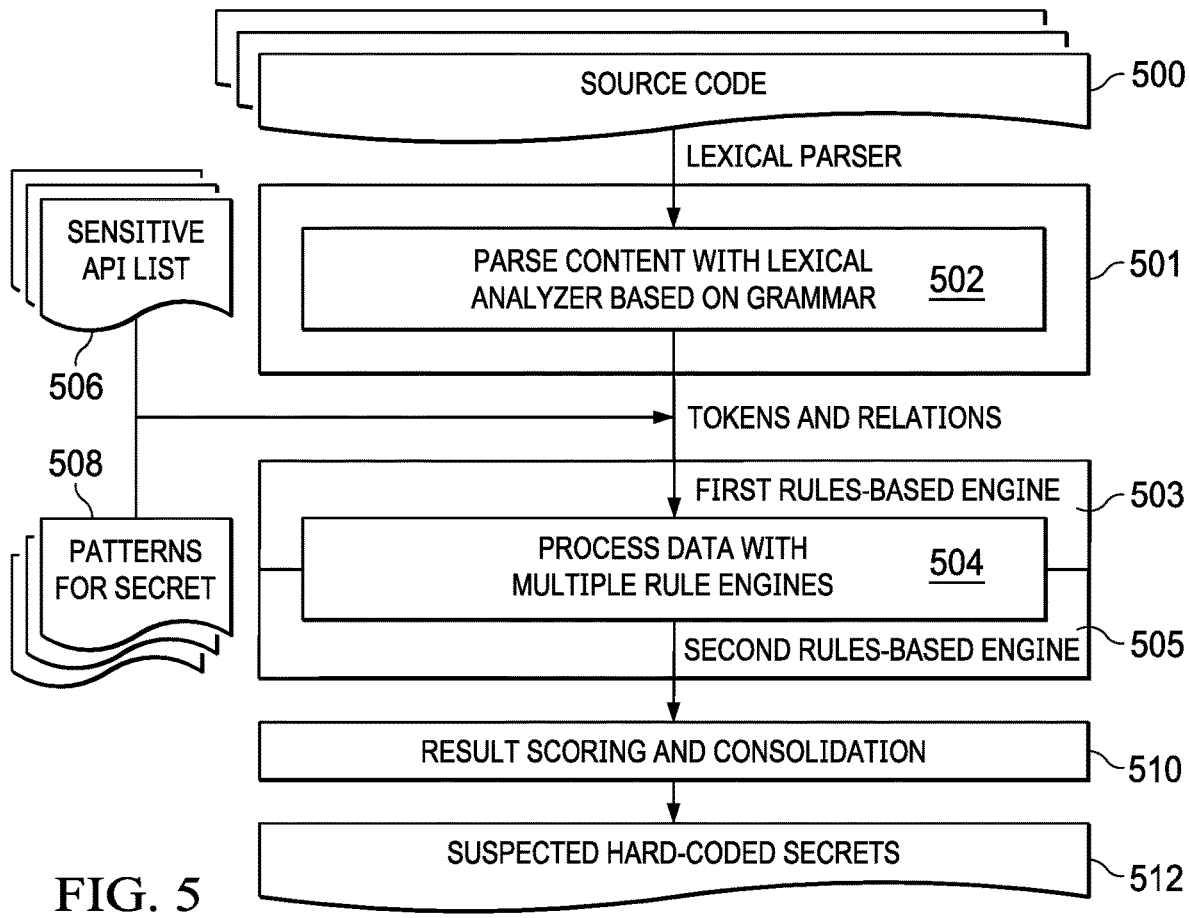
FIG. 5 depicts a mechanism to detect hard-coded secret support in source code according to the technique of this disclosure.

To address this problem, and according to this disclosure, the analysis software is modified (or augmented) to provide a hard-coded support detection mechanism such as depicted in FIG. 5. The mechanism (sometimes referred to herein as an "analyzer") typically is implemented in software, namely, as one or more computer programs that provide the functions and operations that are now described. In a representative embodiment, the mechanism is implemented within or in association with the static analysis module 408 depicted in the SAST tool in FIG. 4. This is not a limitation, however, as the various operations that are described below may be carried out in whole or in part in other programs and processes.

As depicted in FIG. 5, the analyzer 500 receives the source code 502 being tested and applies a lexical parser 501 that, at 502, parses the content through a grammar-based lexical analyzer. This is a known operation and may be carried out by a scanner that generate a call-graph, as described above. The result of applying the grammar-based lexical analyzer is given information, typically a set of tokens and relations. A token may be any construct, such as a keyword, a constant, an identifier, a string, a number, an operator, a punctuation symbol, and the like. Typically, a token comprises a sequence of alphanumeric characters, and one or more predefined rules identify whether a particular sequence can be identified as a valid. Such rules may be defined by a grammar, e.g., as a pattern. Typically, a pattern defines what constitutes a token, and patterns usually are specified using regular expressions.

Referring back to FIG. 5, the tokens and relations are then processed by a rules engine at step 504. In particular, preferably a pair of rules-based engines 503 and 505 are utilized to examine the tokens and relations data that represent the source code, with each of the engines providing a different analytical focus. Although the preferred technique describes the notion of a pair of distinct engines, this is not a requirement, as the functionality may be combined in a single rules-based engine that provides the separate analytical operations described, e.g., using instances of the single rule-based engine, or via multiple passes through the single engine functionality.

To this end, and in addition to the tokens and relations generated by the parser, the first rules engine 503 also receives as input a list of sensitive Application Programming Interfaces (APIs) 506 that are to be evaluated. Likewise, and in addition to the tokens and relations generated by the parser, the second rules engine 505 receives a set of patterns 508 that are to be evaluated. These rules engines are configured to recognize variables intended to be used as a hard-coded secret, and variables that are potential to be secrets. As will be seen by the examples below, hard-coded secret support is detected not only by variable name (e.g., "password" or "pwd"), but also based on where the value comes from and what functionality is intended to consume the data. To this end, the first rules engine 503 applies a first set of one or more rules to the tokens and relations and the API list 506 to generate a first set of results; concurrently, the second rules engine 505 applies a second set of one or more rules to the tokens and relations provided by the parser and the pattern list 508 to generate a second set of results. The engines may operate serially or in parallel, synchronously or asynchronously. The result sets generated by the first and second rules-based engines are then scored and consolidated at 510. The scoring may apply any convenient scoring approach and any rule (or rule type) may be associated with a particular score. A scoring example is provided below. By applying different scores to each rule (or rule type) in the rule sets, the analyzer can enforce any type of weighting scheme. Moreover, the respective result sets from the separate engines may be consolidated as an intersection (i.e. results of the first set that are also found in the results of the second set), a union (i.e. results of the first set or the results of the second set), or some other set theory relationship. The particular consolidation implemented may vary, but results in a set of one or more suspected hard-coded secrets being output at 512. The secrets are output to the developer in any convenient manner, typically as a SAST finding.

Generalizing, the analysis technique of this disclosure leverages language rules and scoring on patterns to find a likelihood of code support for a hard-coded secret. The technique outputs an identification of the hard-coded secret, its location in the source code, and its potential impact when the relevant code path is executed. The approach enables the developer to identify hard-coded secrets (and, in particular, code paths that might later incorporate them) with better precision and lower false positive rates. The rules-based engine approach herein provides more precise and targeted analysis results that are then acted upon by the developer as needed to address any potential hard-coded security vulnerability that might otherwise have arisen (when the source code is later compiled and executed in the run-time computing environment for which it was developed). To this end, and as described, preferably the outputs of the rules-based engines are consolidated and evaluated (typically via scoring) to identify a likelihood that the code under examination includes support for a hard-coded secret. The result is then provided to the developer, e.g., via a notification, an alert, a SAST finding visualization, a proposed code change recommendation, or the like, so that the developer can take further action to address any potential security vulnerability that may arise when the code that includes hard-coded secret support is later used as intended.

FIG. 6 depicts examples of source code snippets that are tested against a first rule set by the first rules engine, namely, to attempt to identify code variables that typically are initialized with static values but then used for various purposes (e.g., as parameters to APIs, as arguments to certain commands, as inputs to other similar entries, etc.). In the following examples, the first rule set comprises a set of first rules (e.g., rules A1-A5), although the number of rules and their structure (i.e., what they test for) may vary. A first rule (A1) in the first set of rules evaluates the code to determine whether the variable is a parameter to a specific algorithm Application Programming Interface (API). FIG. 6 depicts a snippet 600 that includes such variables (namely, "key, iv"). A second rule (A2) in the first set of rules evaluates the code to determine whether the variable is a parameter to a specific security API. FIG. 6 depicts a snippet 602 that includes such a variable (namely, "lpszUsername"). A third rule (A3) in the first set of rules evaluates the code to determine whether the variable is an argument to a specific utility API. FIG. 6 depicts a snippet 604 that includes such a variable (namely, "SetPassword"). A fourth rule (A4) in the first set of rules evaluates the code to determine whether the variable is an argument to a specific system command. FIG. 6 depicts a snippet 606 that includes such a variable (namely, "name" or "password"). A fifth rule (A5) in the first set of rules evaluates the code to determine whether the variable is an input to other entries exhibiting a password-like characteristic. FIG. 6 depicts a snippet 608 that includes such a variable assignment (i.e. pass-argument-to-function) scenario that might be triggered by this rule. A rule of this type thus enables the analyzer to analyze both where a variable comes from (originates), but also the identity of the function or other code that is intended to consume the data held in the variable. In this manner, one or more rules in the first set of rules thus are configured to track back variables potentially used by sensitive APIs in the source code.

FIG. 7 depicts examples of source code snippets that are tested against a second rule set by the second rules engine, namely, to track code variable originality and thereby attempt to find variables that are intended to be used as hard-coded secrets. In the following examples, the second rule set comprises a set of second rules (e.g., rules B1-B4), although once again the number of rules and their structure (i.e., what they test for) may vary. A first rule (B1) in the second set of rules evaluates the code for presence of a string variable that meets certain specific complexity, e.g., containing more than a specific number of characters such as length greater than or equal to N), mixed with upper/lower cases characters, symbols and numbers, etc. FIG. 7 depicts a code snippet 700 that triggers the complexity specified. A second rule (B2) in the second set of rules evaluates the code for presence of a binary variable that meets a specific length, e.g., AES support of key size that is one of: 128, 192 and 256 bits. FIG. 7 depicts a code snippet 702 that meets this criterion. A third rule (B3) in the second set of rules evaluates the code for presence of a variable name having a specific sub-string, e.g., that contain the word "password" or "key." FIG. 7 depicts a code snippet 704 that meets this criterion. Other rules may test a variable (name and content) against other criteria having similar properties and characteristics. In this manner, one or more rules in the second set thus are configured to track variables and to apply different pattern matching rules that enable more fine-grained testing including analysis of particular variable while enabling the analyzer to safely ignore non-critical content.

As noted above, the particular vulnerability mitigation operation that may be implemented by the developer will depend on the nature of the hard-coded secret, its location in the code, the functionality of the code path(s) involved, and so forth. This operation may be varied and may include, without limitation, further evaluation of the code execution path identified (through visual display or otherwise), testing of the code execution path identified, analysis of the code execution path identified, re-writing of the code execution path, and the like.

The following provides additional details regarding lexical analysis provided by the analyzer described above. Generally, a lexical analyzer receives source code as a string, and then finds a token according to the grammar of the programming language used. For example, a variable in C/C++ may be defined by a regular expression, and thus the lexical analyzer can identify the variable via matching regular expression with the source code. To provide a more concrete example, consider the following source sentence (in C): x=a+b*2. According to the C programming language grammar, a C variable can be expressed in the format [a-zA-A-Z_][a-zA-Z_0-9]*, i.e. a string composed by English characters, numbers and underline with non-zero length. So, and considering the example source, when seeing the first white space or the equal sign, the tokenizer is able to identify, e.g., that "x" is a variable in the sentence, and so on for the remainder of the sentence. In existing compiler technology, the compiler stores the source code as a large grammar tree composed of tokens of a known format.

The following provides a scoring example for a variable. Assume the findings for a first Group A: weight 0.4 are the following rules (and their evaluation): a.1, a statically-initialized variable being used by a known crypto API (matched, weight 9); a.2, a statically-initialized variable being used by a known utility API (non-matched, weight 8); a.3, a statically-initialized variable being used by a known system command (matched, weight 8). Assume the findings for a second Group B: weight 0.6 are the following rules (and their evaluation): b.1, the length of a variable's value is greater than a specified N (matched, weight 9); b.2, the length of a variable's value is an exact match for crypto APIs (non-matched, weight 4); b.3, the value includes many symbols/upper cases/numbers (matched, weight 6); b.4, the variable name includes specified sub-strings (non-matched, weight 5). In this example, a weighted score is then computed as $((9+6)/25*0.4)+((9+6)/24*0.6)=64.7\%$. If a relevant threshold is assumed to be 60%, then a potential vulnerability indication is output.

The technique described herein provides significant advantages. It enables static analysis findings to be augmented to include detection of potential hard-coded secret support within the source code under development or test, thereby enabling the user to readily identify places in the code that expose a potential security vulnerability and thus may need to be rewritten or otherwise protected against attack. By defining and applying the rules, potentially in a fine-grained matter, the approach herein enables the analyzer to avoid non-critical content in the source code, to focus on the location of specific patterns (as opposed to merely searching for the patterns without more), to apply different scoring to patterns based on their determined locations and use, and the like, thereby ensuring a match of the hard-coded secret efficiently and accurately. The approach herein also enables the analysis to be based on much more than the variable name itself, but also on the relationship between the variable and associated functions (e.g., as required by particular APIs). The rules-based engine approach describes combines lexical information in a unique way to detect the hard-coded secrets inside the source code. With this combination of lexical information, the approach herein traces back sensitive API usage (while ignoring salts), tracks variable originality, and applies different pattern matching rules for different parts of the source code. As such, the analyzer provides more aggressive and fine-grained analysis of the source code while not being bogged down by non-critical content. Accordingly, the analysis is more computationally- and storage-efficient as compared to techniques that simply perform blunt pattern matching or entropy-based detection.

The lexical information and rules-based engine approach herein provides better detection rates when searching for variables that could be used as secrets, and provides low false-positives (in part by avoiding non-critical code portions, including even sensitive variables names that are not used by sensitive APIs).

The particular result set scoring and/or consolidation scheme utilized may vary.

Further, the use of a hard-coded secret support detection in this manner provides a way to optimize traces identified by the static analysis software. As a variant, different rule set(s) may be used for different traces in a particular set of traces, although typically the technique is used for each of the traces comprising a set of traces for an application under static analysis.

The described approach may be implemented in a stand-alone machine executing a SAST tool, or in a tool that is web- or cloud-based.

Preferably, the techniques herein are implemented in associated with a static analysis tool, such as IBM Security AppScan Source. The reference to this commercial product is exemplary and should not be taken to limit the disclosed technique, which may be implemented on any appliance (or, more generally, machine) having the general characteristics and operating functionality that has been described.

This subject matter may be implemented as-a-service. As previously noted, and without limitation, the subject matter may be implemented within or in association with a cloud deployment platform system or appliance, or using any other type of deployment systems, products, devices, programs or processes. As has been described, the generator tool functionality may be provided as a standalone function, or it may leverage functionality from other products and services.

A representative cloud application platform with which the trace optimization and visualization technique may be implemented includes, without limitation, any standalone or cloud-supported Static Application Security Testing (SAST) framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions described be executed by a particular component as named above, as the functionality herein (or any aspect thereof) may be implemented in other or systems.

The multiple sequence alignment functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, static security analysis tools and systems, as well as improvements to the functioning of data trace processing techniques generally.

As a skilled person will appreciate, the technique herein to identify hard-coded secret support within application source code is highly advantageous as it enables the developer to efficiently detect and then ameliorate the potential vulnerability, e.g., by incorporating a more robust cryptographic algorithm or technique to protect the at-risk code.

Having described the invention, what is claimed is as follows:

1. A method to detect and mitigate a hard-coded secret vulnerability in source code, comprising:
    applying a lexical analysis to the source code to generate given information;
    applying the given information against a rule set, at least a first rule in the rule set being configured to identify a data string that, based on its initial value and a specified function with which it is associated, is indicated for use in the source code as a hard-coded secret, at least a second rule in the rule set being configured to identify a data string that, based on its specified value or characteristic, is indicated for potential use in the source code as a hard-coded secret;
    processing results of applying the given information against the respective first and second rules to identify a likelihood and location in the source code of the hard-coded secret vulnerability; and
    outputting an indication of the hard-code secret vulnerability to enable a subsequent action.

2. The method as described in claim 1 wherein the specified function is one of: a specific algorithm Application Programming Interface (API), a specific security API, a specific utility API, a specific system command, and an operation that passes the data string initial value to the specified function.

3. The method as described in claim 1 wherein the specified value or characteristic is one of: a variable that meets a specific complexity, a variable that meets a specific length, a variable having a name that matches a specific sub-string, and a variable that matches against other pre-defined criteria.

4. The method as described in claim 1 wherein the given information is a set of tokens and relations, and wherein processing results includes receiving a set of scores and applying a consolidation function.

5. The method as described in claim 4 wherein the consolidation function is one of: an intersection of the results of applying rules in the rule set, and a union of the results of applying rules in the rule set.

6. The method as described in claim 1 wherein the first rule is configured to identify a pattern at a particular location within the source code.

7. The method as described in claim 1 wherein the subsequent action is one of: performing a further analysis of the source code, rewriting the source code to excise the hard-coded secret vulnerability, and updating the source code to ameliorate the hard-coded secret vulnerability.

8. Apparatus, comprising:
a processor;
computer memory holding computer program instructions executed by one or more processors to detect and mitigate a hard-coded secret vulnerability in source code, the computer program instructions configured to:
apply a lexical analysis to the source code to generate given information;
apply the given information against a rule set, at least a first rule in the rule set being configured to identify a data string that, based on its initial value and a specified function with which it is associated, is indicated for use in the source code as a hard-coded secret, at least a second rule in the rule set being configured to identify a data string that, based on its specified value or characteristic, is indicated for potential use in the source code as a hard-coded secret;
process results of applying the given information against the respective first and second rules to identify a likelihood and location in the source code of the hard-coded secret vulnerability; and
output an indication of the hard-code secret vulnerability to enable a subsequent action.

9. The apparatus as described in claim 8 wherein the specified function is one of: a specific algorithm Application Programming Interface (API), a specific security API, a specific utility API, a specific system command, and an operation that passes the data string initial value to the specified function.

10. The apparatus as described in claim 8 wherein the specified value or characteristic is one of: a variable that meets a specific complexity, a variable that meets a specific length, a variable having a name that matches a specific sub-string, and a variable that matches against other predefined criteria.

11. The apparatus as described in claim 8 wherein the given information is a set of tokens and relations, and wherein the computer program instructions configured to process results include computer program instructions further configured to receive a set of scores and apply a consolidation function.

12. The apparatus as described in claim 11 wherein the consolidation function is one of: an intersection of the results of applying rules in the rule set, and a union of the results of applying rules in the rule set.

13. The apparatus as described in claim 8 wherein the first rule is configured to identify a pattern at a particular location within the source code.

14. The apparatus as described in claim 8, further including computer program instructions configured to carry out the subsequent action that is one of: performing a further analysis of the source code, rewriting the source code to excise the hard-coded secret vulnerability, and updating the source code to ameliorate the hard-coded secret vulnerability.

15. A computer program product in a non-transitory computer readable medium for use a data processing system, the computer program product holding computer program instructions executed by the data processing system to detect and mitigate a hard-coded secret vulnerability in source code, the computer program instructions configured to:
apply a lexical analysis to the source code to generate given information;
apply the given information against a rule set, at least a first rule in the rule set being configured to identify a data string that, based on its initial value and a specified function with which it is associated, is indicated for use in the source code as a hard-coded secret, at least a second rule in the rule set being configured to identify a data string that, based on its specified value or characteristic, is indicated for potential use in the source code as a hard-coded secret;
process results of applying the given information against the respective first and second rules to identify a likelihood and location in the source code of the hard-coded secret vulnerability; and
output an indication of the hard-code secret vulnerability to enable a subsequent action.

16. The computer program product as described in claim 15 wherein the specified function is one of: a specific algorithm Application Programming Interface (API), a specific security API, a specific utility API, a specific system command, and an operation that passes the data string initial value to the specified function.

17. The computer program product as described in claim 15 wherein the specified value or characteristic is one of: a variable that meets a specific complexity, a variable that meets a specific length, a variable having a name that matches a specific sub-string, and a variable that matches against other predefined criteria.

18. The computer program product as described in claim 15 wherein the given information is a set of tokens and relations, and wherein the computer program instructions configured to process results include computer program instructions further configured to receive a set of scores and apply a consolidation function.

19. The computer program product as described in claim 18 wherein the consolidation function is one of: an intersection of the results of applying rules in the rule set, and a union of the results of applying rules in the rule set.

20. The computer program product as described in claim 15 wherein the first rule is configured to identify a pattern at a particular location within the source code.

21. The computer program product as described in claim 15, further including computer program instructions configured to carry out the subsequent action that is one of: performing a further analysis of the source code, rewriting the source code to excise the hard-coded secret vulnerability, and updating the source code to ameliorate the hard-coded secret vulnerability.

* * * * *